L. T. BATES.
APPARATUS FOR INDICATING THE COURSE OF SHIPS OR VESSELS.
APPLICATION FILED OCT. 1, 1917.
1,261,682.
Patented Apr. 2, 1918.
3 SHEETS—SHEET 2.
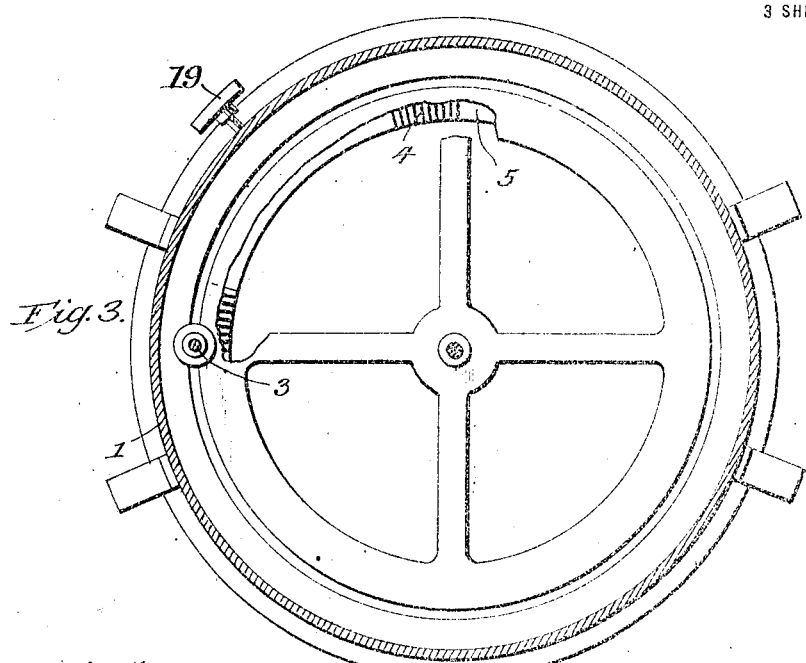
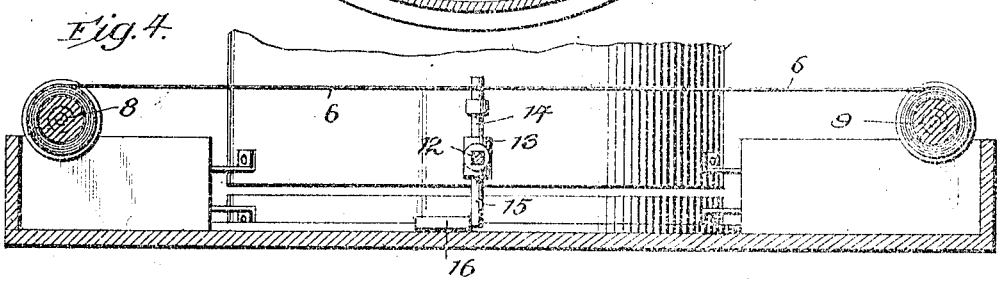
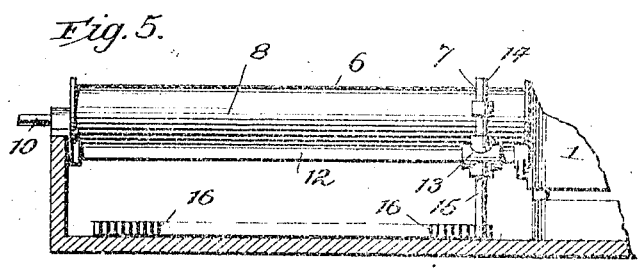

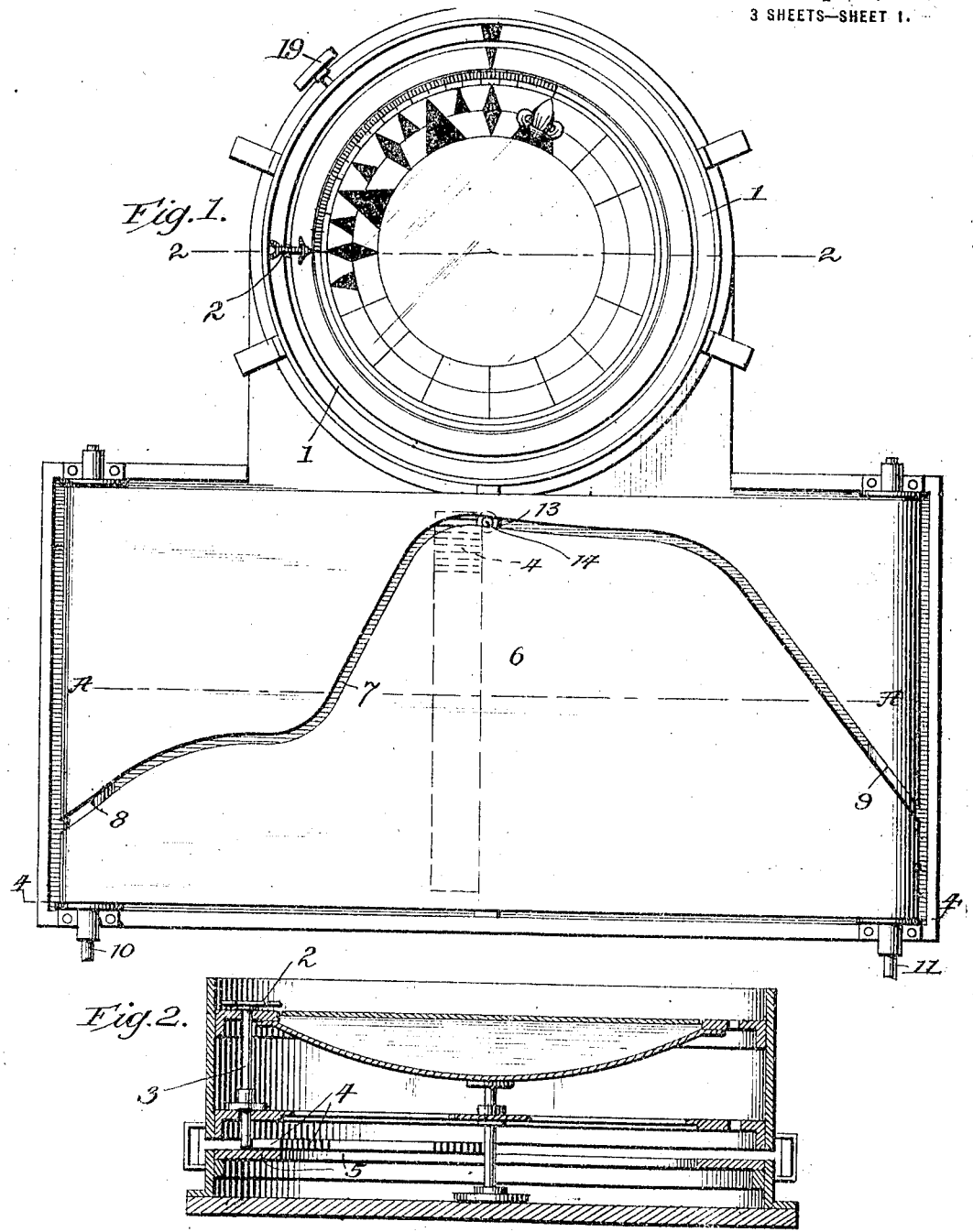

L. T. BATES.
APPARATUS FOR INDICATING THE COURSE OF SHIPS OR VESSELS.
APPLICATION FILED OCT. 1, 1917.
1,261,682. Patented Apr. 2, 1918.
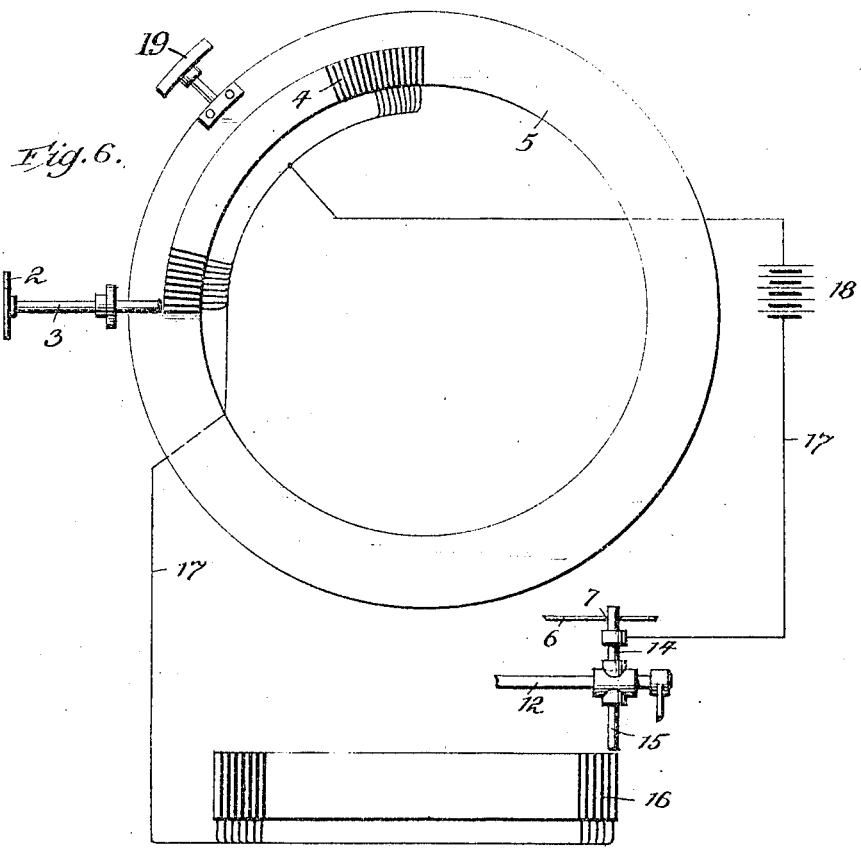
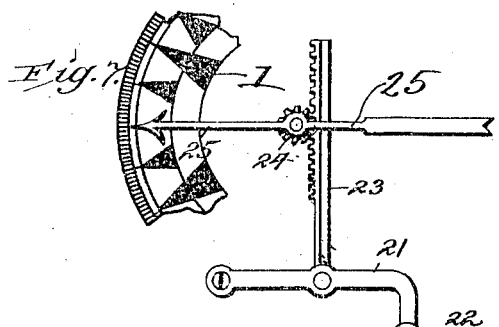
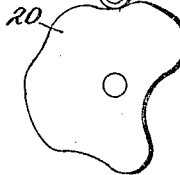

UNITED STATES PATENT OFFICE.

LINDELL T. BATES, OF NEW YORK, N. Y.

APPARATUS FOR INDICATING THE COURSE OF SHIPS OR VESSELS.

1,261,682.     Specification of Letters Patent.     Patented Apr. 2, 1918.

Application filed October 1, 1917. Serial No. 194,225.

*To all whom it may concern:*

Be it known that I, LINDELL T. BATES, a citizen of the United States, residing at New York, in the county of New York and State of New York, have invented a certain new and useful Improvement in Apparatus for Indicating the Course of Ships or Vessels, of which the following is a specification.

This invention pertains to an improved apparatus for indicating the course through which a ship or vessel is to be steered, with a view primarily of avoiding submarine attacks.

In modern naval tactics the so-called zigzag course plays an important part. In battle the war vessels usually steer a different course every few minutes, and merchant vessels, to avoid submarines, have similar instructions for transit through certain parts of the sea. Up to the present time, however, the zigzag courses have been successive straight courses of various lengths in various directions. The shortest courses practised are five minute legs. This is long enough for a torpedo to reach the vessel or its range to be found, before the next change of course falls due. On the other hand, the best type of zigzag course, in order to increase the chance of torpedo and shell fire error, is a curve, or a series of curves, an S-course, so that at no two moments is the vessel on the same course.

It has not been practicable to date to steer a curved course, owing to the burden placed upon the helmsman of referring to a course plan or of paying attention to the bell or light indications of a signal-board. The latter cannot conveniently be made so as to provide for a constantly changing course. Further, they divert the attention of the helmsman from his compass at a critical time. Signal-boards heretofore used do not enable the helmsman to know at any given moment just how many degrees away from the normal course that the vessel finds herself.

The object of this invention is to provide apparatus which will indicate silently any desired course, straight or curved, in such a manner that the helmsman need not take his eyes off of the compass to steer that course, and so that at any given moment he may know how many degrees off the normal course the vessel finds herself.

Electrically or mechanically actuated apparatus may be used.

Several embodiments of mechanism whereby the object above set forth may be effected are shown in the annexed drawings, wherein:

Figure 1 is a top plan view illustrating a ship's compass and the means associated therewith for moving an indicator through a predetermined zigzag course;

Fig. 2 a transverse vertical sectional view, taken on the line 2—2 of Fig. 1, and on a somewhat enlarged scale;

Fig. 3 a horizontal sectional view showing the electro-magnets employed to position the indicator;

Fig. 4 a longitudinal sectional view taken on the line 4—4 of Fig. 1;

Fig. 5 a transverse sectional view of the circuit-closer and its allied elements;

Fig. 6 a diagrammatic view showing the circuits, certain of the mechanical elements being shown out of their normal planes for the purpose of illustration; and Fig. 7 a diagrammatic view showing a modification of the invention.

The drawings are more or less diagrammatic throughout and are to be considered with this statement in view.

The structure may be said to comprise a compass, an indicator associated with said compass, and working in close relation thereto, and means for moving said indicator relatively to the compass or the graduations thereon, said means comprising any device which will cause the indicator to move back and forth and to indicate a predetermined or plotted course which the helmsman must follow.

Referring to the construction shown in Figs. 1 to 6 inclusive, 1 denotes a compass and 2 an indicator adapted to be moved by the mechanism hereinafter described back and forth about the circumference of the compass to indicate a deviation from the normal course of the vessel, which deviation the helmsman must follow. In the preferred embodiment of the invention this arrow or indicator is moved electrically, and to effect this the lower end of the arm or rod 3 forms an armature which lies adjacent to a series of electromagnets 4. In the form illustrated, these electromagnets are mounted upon an arc-shaped frame 5, which extends through 90°. The frame is movable so that it may be placed in relation to the circumference of the compass according to the normal course of the vessel, so that the indicator will, as it is moved, show the helmsman how much deviation there must be at any given moment to one or the other side of said normal course. It is conceivable that magnets might occupy a complete circle, coextensive of the circumference of the compass, but the inclusion of magnets throughout the entire circumference multiplies the number considerably and requires unnecessary wiring. By arranging the magnets upon a shiftable frame this difficulty is overcome.

Located adjacent the compass is an apron 6, having formed therein a groove or channel 7, which is plotted to represent the direction which the ship or vessel is to take to one or the other side of its normal course. This apron may be moved in any suitable manner, and for the purpose of illustration I have shown it as being attached to rollers 8 and 9, about which it is wound and unwound. Any suitable clock-driven mechanism (not shown) may be attached to the shafts 10 and 11 of the rollers, so that the apron may be constantly moved, and at a predetermined speed. Located below the apron, and extending transversely thereof is a fixed guide rod 12, upon which is mounted a slide 13, carrying a rod 14, the upper end of which extends into the groove or channel 7. The rod 14 and its attached slide are thus shifted back and forth along the rod 12. To the lower portion of the slide 13 is secured a circuit-closer 15, which overlies a series of terminals or contacts 16, of a number equal to the number of magnets 4. The magnets and said terminals 16 are included in a circuit 17, in which a battery or other source of electricity 18 is included. As the slide 13 is shifted, the circuit-closer 15 will be carried into line with one or another of the terminals, and as a consequence the corresponding electromagnet will be energized and the rod 3 shifted accordingly, carrying the indicator 2 to the determined position with reference to the marking upon the compass.

As above noted, the frame 5 will be shifted according to the normal direction of the ship prior to the beginning of the zigzagging thereof, and to facilitate this shifting the frame is provided with a handle 19.

From the foregoing it will be observed that the mechanism is entirely automatic in its operation, and that the helmsman merely has to watch the indicator and keep the ship upon that course which is shown thereby. This will cause the vessel to take a course similar to that outlined or plotted by the groove 7 upon the movable apron or actuator 6. The helmsman does not, therefore, have to look up for lights or listen for signals to know that he is to change his course, as is now commonly done. Furthermore, it facilitates the vessel taking a course composed of curves, or stated generally an S-shaped course, which is of marked advantage over a course where the vessel runs upon straight legs, for the reason that it is more difficult for a submarine to get the proper range, as the position of the vessel is constantly changing.

In Fig. 7 I have indicated diagrammatically a modified arrangement, wherein, instead of employing an apron or traveling actuator to control the operation of the indicator, an element or cam as 20 is employed. This element is mounted upon a shaft which is constantly rotated, and the contour of the element corresponds to the course which it is desired to have the vessel take in deviating from its normal course. An elbow-lever 21, overlies the actuating member 20, and a roller 22, carried by the free end of the lever, contacts with the face of the actuating member 20. A rack-bar 23 is connected with the lever and meshes with a pinion 24, which carries an indicator-needle 25 which coöperates with a compass, indicated by 26. It is to be understood, of course, as above stated, that Fig. 7 is merely diagrammatic and that the compass is shown in part only.

A center line A—A, Fig. 1, appearing on the apron, represents the normal course of the ship. The helmsman by observing the position relative thereto of the rod 14 knows the position of the ship with reference to its normal course.

While the term "ship's compass" is used throughout the description and claims, it is to be understood that any known and suitable form or type of compass may be employed, and the claims are to be interpreted with this understanding.

Having thus described my invention, what I claim is:

1. In combination with a ship's compass, an indicator associated therewith; and means for automatically moving said indicator with reference to the compass according to a predetermined course through which the ship is to be steered.

2. In combination with a ship's compass, an indicator associated therewith and serving, through its movement with reference to the compass, to indicate the course through which the ship is to be steered; and means for moving said indicator through a predetermined path.

3. In combination with a ship's compass, an indicator associated therewith; and means presenting an outline of the course through which the ship is to be steered, said means serving to move the indicator with reference to the compass to indicate such predetermined course.

4. In combination with a ship's compass, an indicator associated therewith and movable with reference thereto to indicate a predetermined course through which the ship is to be steered; and means for moving said indicator with reference to the compass, said means embodying an actuated element having the predetermined course for the ship laid out thereon.

5. In combination with a ship's compass, an indicator associated therewith and movable with reference thereto to indicate a predetermined course through which the ship is to be steered; and actuating means for said indicator, said means being bodily shiftable with reference to the compass, whereby the indicator may be initially set in line with the normal course or path of the vessel as indicated by the compass.

6. In combination with a ship's compass, an indicator associated therewith and movable with reference thereto to indicate a predetermined course through which the ship is to be steered; a positively actuated element having such predetermined course outlined thereon; and connections between said element and the indicator for moving the latter in consequence with the outlined course.

7. In combination with a ship's compass, a movable indicator associated therewith; an actuated element having a bearing surface thereon conforming to a predetermined course through which the ship is to be steered; and actuating connections between said surface and the indicator.

8. In combination with a ship's compass, an indicator associated therewith; and means presenting an outline of the course through which the ship is to be steered, said means serving to move the indicator with reference to the compass to indicate such predetermined course, and said means likewise having thereon an indication of the normal course of the ship.

9. In combination with a ship's compass, an indicator associated therewith; and a cam for actuating said indicator, said cam presenting an outline of the course through which the ship is to be steered.

10. In combination with a ship's compass, an indicator associated therewith; a cam having an outline of the course through which the ship is to be steered; and means interposed between said cam and the indicator for causing the latter to move with reference to the compass in accordance with the contour of the cam.

11. In combination with a ship's compass, an indicator associated therewith; a constantly-moving cam, said cam having formed thereon a predetermined outline of the course through which the ship is to be steered; and means interposed between said cam and the indicator for moving the latter.

In testimony whereof I have signed my name to this specification.

LINDELL T. BATES.